(12) United States Patent
Kalantarifiroozabad et al.

(10) Patent No.: US 8,209,971 B2
(45) Date of Patent: Jul. 3, 2012

(54) BURNER FOR HEATING A STREAM OF GAS

(75) Inventors: Keivan Kalantarifiroozabad, Toronto (CA); Janusz Popik, Mississauga (CA)

(73) Assignee: Nett Technologies Inc., Mississauga (CA)

( * ) Notice: Subject to any disclaimer, the term of this patent is extended or adjusted under 35 U.S.C. 154(b) by 297 days.

(21) Appl. No.: 12/707,944

(22) Filed: Feb. 18, 2010

(65) Prior Publication Data

US 2011/0197570 A1 Aug. 18, 2011

(51) Int. Cl.
*F01N 3/38* (2006.01)
(52) U.S. Cl. ............. 60/303; 60/286; 60/295; 60/297; 60/311; 431/249; 431/260; 431/284; 431/286
(58) Field of Classification Search .......... 60/286, 60/295, 297, 303, 311; 431/249–266, 278–286
See application file for complete search history.

(56) References Cited

U.S. PATENT DOCUMENTS

| | | | |
|---|---|---|---|
| 3,059,421 A * | 10/1962 | Schnabel | 60/303 |
| 3,806,322 A * | 4/1974 | Tabak | 422/170 |
| 3,993,449 A * | 11/1976 | Childs | 422/172 |
| 4,280,806 A * | 7/1981 | King | 431/208 |
| 4,571,938 A * | 2/1986 | Sakurai | 60/303 |
| 4,987,738 A * | 1/1991 | Lopez-Crevillen et al. | 60/286 |
| 5,063,737 A * | 11/1991 | Lopez-Crevillen et al. | 60/286 |
| 5,320,523 A * | 6/1994 | Stark | 431/353 |
| 5,826,428 A * | 10/1998 | Blaschke | 60/303 |
| 6,508,056 B1 * | 1/2003 | Brandon | 60/765 |
| 2005/0150219 A1 * | 7/2005 | Crawley et al. | 60/295 |
| 2008/0307780 A1 * | 12/2008 | Iverson et al. | 60/311 |

* cited by examiner

*Primary Examiner* — Kenneth Bomberg
*Assistant Examiner* — Jorge Leon, Jr.
(74) *Attorney, Agent, or Firm* — Homigman Miller Schwartz and Cohn LLP

(57) ABSTRACT

The present disclosure provides a burner for increasing the temperature of a gas stream, such as an exhaust gas stream, to burn particulate matter and unburnt hydrocarbons within the exhaust gas. As well, by heating or increasing the temperature of the gas stream and combustion products exiting the burner, the gas stream is brought into a condition more suitable for additional treatment to further reduce exhaust gas emissions from the engine. The device includes an outer housing and a series of combustion chambers mounted within the outer housing for increasing and further developing combustion of the incoming gases within the series of combustion chambers. A primary application for the device is for use with diesel engines to burn particulate matter and unburnt hydrocarbons within the diesel emissions and/or act as a heat source for activating diesel particulate filters and/or other catalytic components or devices.

31 Claims, 7 Drawing Sheets

BURNER FOR HEATING A STREAM OF GAS

TECHNICAL FIELD

The present disclosure relates generally to a burner for heating a stream of gas. More particularly, in one embodiment the invention relates to a burner for heating the exhaust gases from an internal combustion engine to aide in reducing the hydrocarbon emissions from internal combustion engines.

BACKGROUND

With environmental standards continually changing and requiring stricter emission controls and tighter air quality standards, there is a continual need for new and improved devices to help reduce exhaust gas emissions from internal combustion engines and the like. More specifically, devices that require fewer components, that are less costly to manufacture, and that are easier to maintain are desirable.

When considering diesel engines, for example, these engines are known to discharge exhaust gases that contain several constituents that are harmful to human health and to the environment. In order to reduce harmful exhaust emissions, diesel traps or filters and diesel catalysts are often used. Diesel particulate filters (DPF) control diesel particulate matter emissions by physically trapping the particulates within the device. Diesel catalysts control emissions by promoting chemical changes in the exhaust gas and are most effective towards reducing gaseous emissions, i.e., hydrocarbons and carbon monoxide. Diesel particulate filters and diesel catalysts may be used independently or in combination with each other or with other after-treatment devices.

While diesel particulate filters can achieve very high soot (i.e. particulate matter) removal efficiencies, they are limited in the sense that they eventually become blocked with the particulate matter. Therefore, it is desirable to find ways to regenerate the filter from the particulate matter in a reliable, cost-effective manner. Diesel oxidation catalysts, which are used to increase the temperature upstream of the DPF, operate most efficiently at higher temperatures; therefore, it is desirable to find ways to heat catalysts so as to bring them to their optimal operating temperature to ensure reduction of exhaust gas emissions, especially particulate matter in the case of diesel engines. Various techniques have been adopted to assist with and/or improve the regeneration of the particulate matter from filter devices as well as to improve the efficiency of catalytic devices, such as the installation of a burner, or an after-treatment device to burn particulate matter and unburnt hydrocarbons, and/or heat up catalytic components which are useful to increase the temperature of exhaust gases and reduce emissions. These burners, however, often require the installation of complex components that rely on external or auxiliary air compressors (or blowers) as well as high pressure fuel injectors and they tend to be costly to produce, difficult to maintain, and difficult to tailor to a particular application to ensure that optimal results are achieved in reducing exhaust emissions for a particular application.

Therefore, with environmental concerns continually on the rise, it is desirable to provide simplified, easily tailored, burners or exhaust gas after-treatment devices which can assist in reducing harmful exhaust gas emissions and improve local air quality.

SUMMARY OF THE INVENTION

The present disclosure provides a burner for increasing the temperature of an incoming stream of gas. In a particular embodiment, the present disclosure relates to a burner for increasing the temperature of the exhaust gases of an internal combustion engine rendering the exhaust gas more suitable for additional treatment to further reduce exhaust gas emissions from the engine. For instance, increasing the temperature of the exhaust gas can help to burn particulate matter contained in the exhaust gas, which can help prevent the blocking of filter elements or any other after-treatment or further device located downstream from the burner. Increasing the temperature of the exhaust gas can also help to burn unburnt hydrocarbons, nitrogen oxides, etc. within the exhaust system before they are released into the environment. Increasing the temperature of the exhaust gas can also help to activate catalysts or catalytic coatings in further treatment devices downstream in the system, as these types of devices operate more effectively and efficiently at higher temperatures. However, while the principal application of the device is intended for use in internal combustion engines, most specifically diesel engines, it will be understood by persons skilled in the art that this device can also be used and adapted for applications where it is desirable to increase the temperature of an incoming gas, and should not be limited to use with internal combustion engines.

In accordance with one example embodiment of the present disclosure there is provided a burner, comprising: an outer housing having a first end and a second, outlet end; a gas inlet connected to said outer housing for introducing a stream of gas tangentially into said outer housing, the gas inlet being connected to a gas source; a primary combustion chamber mounted in communication with said outer housing and having at least one opening formed therein for introducing gas from the gas inlet tangentially into the primary combustion chamber; a first stage combustion chamber mounted within said outer housing and in communication with said primary combustion chamber, the first stage combustion chamber having at least one opening formed therein for introducing additional gas from the gas inlet tangentially into said first stage combustion chamber; a second stage combustion chamber mounted within said outer housing and in communication with said first stage combustion chamber, the second stage combustion chamber having at least one opening formed therein for introducing additional gas from the gas inlet tangentially into said second stage combustion chamber, the second stage combustion chamber being in communication with the second, outlet end of the outer housing; a fuel inlet disposed in communication with the primary combustion chamber for introducing fuel into the primary combustion chamber, the fuel inlet being located proximal to the at least one opening formed in the primary combustion chamber; and an ignition device mounted in conjunction with the fuel inlet for igniting fuel upon introduction into the primary combustion chamber; wherein at least a portion of the gas entering the burner is mixed with fuel introduced by the fuel inlet, said gas and fuel mixture being ignited within the primary combustion chamber and undergoing further combustion in the first stage and second stage combustion chambers to increase the temperature of the gas exiting the burner and to aid in the reduction of particulate matter and unburnt gaseous constituents within the gas.

In accordance with another example embodiment of the present disclosure there is provided a burner for heating an incoming exhaust gas stream, the burner comprising: an outer housing having a first end and a second, outlet end; an exhaust gas inlet connected to said outer housing for introducing exhaust gas tangentially into said outer housing, the exhaust gas inlet being connected to an exhaust gas source; a primary combustion chamber mounted in communication with said outer housing and having at least one opening formed therein for introducing exhaust gas from the exhaust gas inlet tangentially into the primary combustion chamber; a first stage combustion chamber mounted within said outer housing and in communication with said primary combustion chamber, the first stage combustion chamber having at least one opening formed therein for introducing further exhaust gas tangentially into said first stage combustion chamber; a fuel inlet disposed in communication with the primary combustion chamber for introducing fuel into the primary combustion chamber, the fuel inlet being located proximal to the at least one opening formed in the primary combustion chamber; and an ignition device mounted in conjunction with the fuel inlet for igniting fuel upon injection into the primary combustion chamber; wherein at least a portion of the exhaust gas entering the burner is mixed with fuel introduced by the fuel inlet, said exhaust gas and fuel mixture being ignited within the primary combustion chamber and undergoing further combustion in the first stage combustion chamber to increase the temperature of the gas exiting the burner and to aid in the reduction of particulate matter and unburnt gaseous constituents within the exhaust gas.

BRIEF DESCRIPTION OF THE DRAWINGS

Embodiments of the present disclosure will now be described, by way of example only, with reference to the attached Figures, wherein.

Like reference numerals are used in the drawings to denote like elements and features.

DETAILED DESCRIPTION OF THE EXAMPLE EMBODIMENTS

Figure 1:
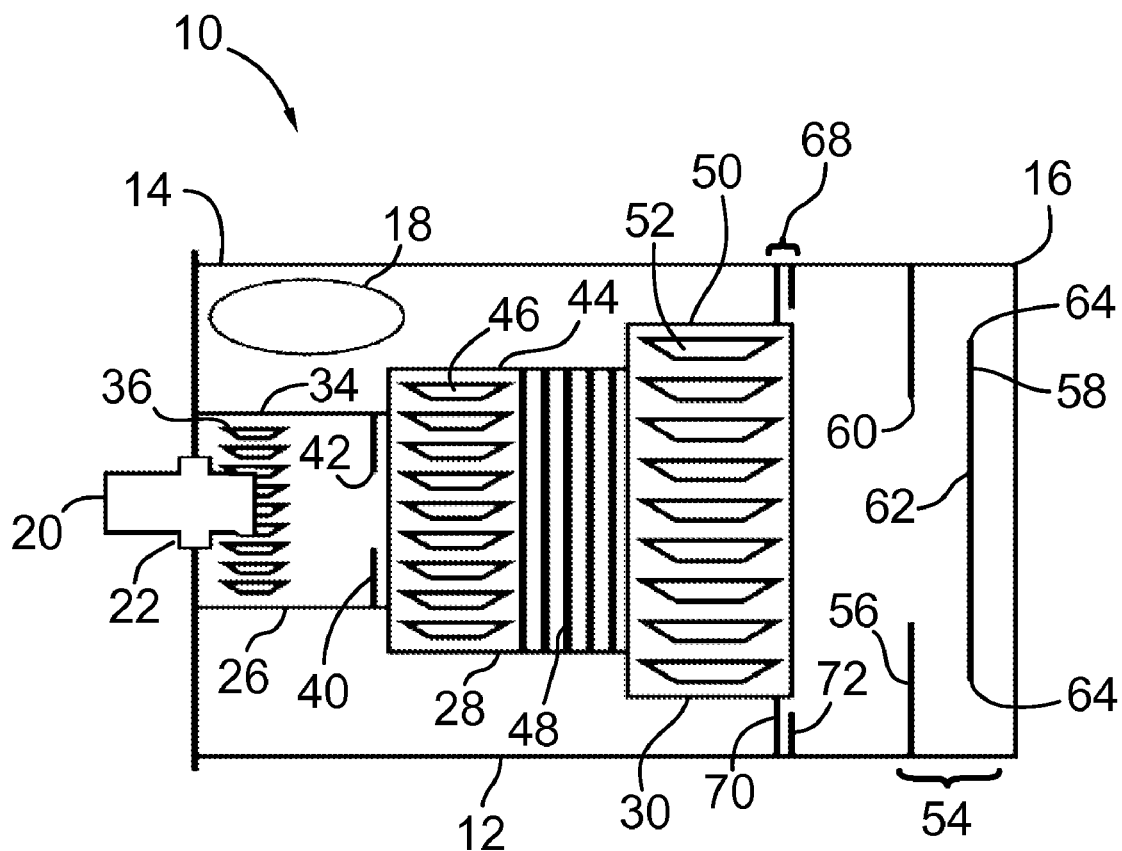
FIG. 1 is a cross-sectional schematic view of a device according to one example embodiment of the present disclosure.

Referring now to the drawings, there is shown in FIG. 1 a schematic drawing of an exemplary burner device 10 to which example embodiments of the present disclosure can be applied. While the example embodiments described below will be discussed with reference to the particular embodiment wherein the burner 10 is used to heat the exhaust gas from an internal combustion engine, it will be appreciated by those of ordinary skill in the art that the burner 10 could equally be used to heat a stream of gas from a wide variety of other sources for a variety of other purposes and applications.

The burner 10 comprises an outer housing 12 generally having a first (or inlet) end 14 and a second (or outlet) end 16. The outer housing 12 includes an exhaust gas inlet 18 located proximal to the first, inlet end 14 of the outer housing 12 for tangentially introducing exhaust gas into the interior of the outer housing 14 of the device 10. Accordingly, the exhaust gas inlet 18 may itself be located tangentially to the outer housing 12 or the inlet 18 may be oriented differently but equipped with additional features, such as baffle plates (not shown) for directing the exhaust gas to ensure that it enters the housing 12 in a tangential direction. The exhaust gas inlet 18 is connected directly to the exhaust line of the engine (not shown) and, therefore, the burner 10 will continuously be fed with a supply of exhaust gas when the engine is idling or operating at a higher load. In this specific embodiment, no separate or auxiliary air injection is provided. The main supply of oxygen to the burner 10 for combustion is by means of its direct connection to the exhaust line through the exhaust gas inlet 18. Accordingly, only a very simple connection between the burner 10 and the exhaust system of the vehicle or engine is required.

The burner 10 includes a fuel inlet 20 located at the first or inlet end 14 of the outer housing 12 for introducing fuel into the device 10. Typically, diesel fuel will be supplied or dosed to the burner 10 via the fuel inlet 20, although other types of fuel may be used depending upon the particular application of the burner 10. An ignition device 22, which in the embodiment shown is in the form of a glow plug assembly, is mounted in conjunction with the fuel inlet 20 for igniting the fuel/air (i.e. exhaust gas) mixture as it enters the burner 10. Therefore, in principal, fuel is supplied to the burner 10 through the ignition device 22, in this case a glow plug assembly, which forms part of the fuel inlet 20. The burner 10 typically is provided with a controller device (not shown) which controls the operation of the glow plug assembly 22. In some embodiments, the controller device is powered by the engine/vehicle power source. No high-pressured fuel injection is required and only a basic glow plug assembly 22 known to persons skilled in the art is required for igniting the fuel/air mixture in this particular embodiment. Accordingly, the present device 10 offers simplified components that require less complex installation and maintenance rendering the device less costly to produce and more easily adapted for various applications. It will be understood, however, that while the fuel inlet 20 and ignition device 22 are shown as being combined as a single inlet into the burner 10 in the subject embodiment, in alternate embodiments the fuel inlet 20 may be formed as an independent or separate port to the ignition device 22.

Mounted within the outer housing 12 is a series of combustion chambers all in communication with each other, the series of combustion chambers all being exposed to the exhaust gases that enter the interior of the outer housing 12 through the exhaust gas inlet 18. In the example embodiment illustrated by FIG. 1, the burner 10 includes a primary combustion chamber 26, a first stage combustion chamber 28, and a second stage combustion chamber 30. The primary, first stage and second stage combustion chambers 26, 28, 30 are all mounted sequentially within the outer housing 12 with the primary combustion chamber 26 being in direct communication with the fuel inlet 20 and glow plug assembly 22, and with the primary combustion chamber 26 being mounted to and in communication with the first stage combustion chamber 28, which in turn is mounted to and in communication with the second stage combustion chamber 30. The multi-stage combustion that occurs within the burner 10 as a result of the various combustion chambers that are provided results in a very stable combustion process within the burner.

The primary combustion chamber 26 has an outer sidewall 34 defining an interior cavity into which the diesel fuel (or other fuel) is supplied via the fuel inlet 20 and glow plug assembly 22 in the outer housing 12. At least one opening 36 is formed in the outer sidewall 34 of the primary combustion chamber 26, proximal to the fuel inlet 20 and glow plug assembly 22, for tangentially introducing exhaust gas from the interior of the outer housing 12 into the primary combustion chamber 26. By forming the opening 36 in the sidewall 34 of the primary combustion chamber 26, the exhaust gas (which includes oxygen) is introduced tangentially into the primary combustion chamber 26. The tangential introduction of the exhaust gas into the primary combustion chamber 26 causes the exhaust gas to spiral or swirl within the interior cavity of the primary combustion chamber 26 thereby creating a vortex action within the primary combustion chamber 26. The vortex action of the exhaust gas in the primary combustion chamber 26 creates a certain degree of turbulence within the interior cavity of the chamber which promotes mixing of the fuel and air (i.e. exhaust gas) entering the chamber. The vortex action within the chamber, therefore, helps to ensure that a proper fuel/air mixture is achieved, which helps the ignition process and creates and maintains a steady flame within the primary combustion chamber 26, which begins the combustion process within the burner 10. While in the example embodiment shown in FIG. 1 a series of circumferentially spaced tangential slot-like openings 36 are formed in the sidewall 34 of the primary combustion chamber 26, it will be understood that in other example embodiments, various other configurations are contemplated for openings 36, all of which are included within the scope of this description. For instance, in some example embodiments, rather than having a series of circumferentially spaced slot-like openings, only a single circular opening may be provided, provided that the single opening 36 is positioned in close proximity to the fuel inlet 20 and glow plug assembly 22 and that the opening 36 is sized appropriately to ensure that sufficient exhaust gas enters the primary combustion chamber 26 to achieve the same vortex action and desired amount of turbulence to ensure that a favorable fuel/air mixture is achieved so that ignition can occur to produce a stable flame. As well, in addition to the circumferentially spaced slot-like openings, hooded openings or tangentially drilled circular openings may be provided.

Within the primary combustion chamber 26, a first flame holder device 40 is mounted just prior to the interconnection with the first stage combustion chamber 28. The first flame holder device 40 serves to protect the flame that has been ignited within the primary combustion chamber 26 and helps to prevent the flame from being extinguished. In one example embodiment, the first flame holder 40 is in the form of an internal plate-like member such as an annular plate or washer-like structure positioned towards the end of the primary combustion chamber 26. The plate-like structure of the flame holder device 40 provides a reduced central opening 42 between the primary combustion chamber 26 and the first stage combustion chamber 28. The reduced opening 42 in the first flame holder 40 protects the flame in the primary combustion chamber 26 from the swirling vortex action of the exhaust gases in the first stage combustion chamber 28, as will be described in further detail below, while still allowing the flame to travel from the primary combustion chamber 26 to the first stage combustion chamber 28. The reduced opening 42 between the primary combustion chamber 26 and the first stage combustion chamber 28 also has the effect of holding some of the flame that is produced in the primary combustion chamber 26 back, which helps to increase the overall temperature of the primary combustion chamber 28 thereby further improving the quality of combustion within the primary combustion chamber 26. The first flame holder device 40 may also be formed with an opening at the base thereof (see FIG. 3) which allows any residual liquid, un-ignited fuel that remains in the primary combustion chamber to pass into the first stage combustion chamber 28, as will be described in further detail below.

The first stage combustion chamber 28 is similar in structure to the primary combustion chamber 26 in that it too has an outer sidewall 44 defining the interior cavity of the first stage combustion chamber 28. In this particular embodiment, the first stage combustion chamber 28, however, has a larger diameter than the primary combustion chamber 26 and, therefore, has a larger interior cavity. The first stage combustion chamber 28, is also formed with at least one circumferentially spaced opening 46 in the outer sidewall 44 of the first stage combustion chamber 28 for tangentially introducing exhaust gas from the interior of the outer housing 12 into the first stage combustion chamber 28. As in the primary combustion chamber 26, the at least one circumferentially spaced, tangential opening 46 causes the exhaust gases to swirl and/or spiral as they enter the first stage combustion chamber 28 creating a vortex action within the first stage combustion chamber 28. In this particular embodiment, the first stage combustion chamber 28 is formed with a plurality of circumferentially spaced openings 46. The first stage combustion chamber 28 typically has more and larger openings 46 than the opening(s) 36 that are formed in the primary combustion chamber 26 to allow more exhaust gases to enter the first stage combustion chamber 28. The size and the number of openings 46 provided in the sidewall 44 of first stage combustion chamber 28 is such that the amount of exhaust gas that enters the first stage combustion chamber 28 is sufficient to further promote combustion and flame production as well as to create enough controlled turbulence within the first stage combustion chamber 28 to ensure that any residual liquid fuel (i.e. un-ignited, non-evaporated fuel) from the primary combustion chamber 26, which may pass into the first stage combustion chamber 28, is exposed to the additional turbulence to promote evaporation and/or combustion of the residual liquid fuel.

The first stage combustion chamber 28 may include additional features to assist with and promote evaporation of any residual liquid fuel that may pass from the primary combustion chamber 26 into the first stage combustion chamber 28. For instance, the interior walls of the first stage combustion chamber 28 may be formed with spiraling ridges 48, or a spring-like body may be mounted within the first stage combustion chamber 28, to create a fuel evaporation zone in the first stage combustion chamber 28. By having the interior walls of the first stage combustion chamber 28 formed with spiraling ridges, the effective surface area of the first stage combustion chamber 28 is increased thereby providing a greater area of heated surfaces which helps to promote fuel evaporation. Other fuel evaporation means may be incorporated in the first stage combustion chamber 28 such as a wire mesh, which also increases surface area and promotes fuel evaporation as well as minimizing condensation or fuel droplet formation on the surface of the first stage combustion chamber 28. The first stage combustion chamber 28 may also be fitted with other catalyzed objects to assist with fuel evaporation. By incorporating fuel evaporation enhancement devices (i.e the spiral ridges, the wire mesh, catalyzed objects or metallic foams, etc.) within the first stage combustion chamber 28, the axial length of the first stage combustion chamber 28 may be significantly reduced as compared to the axial length of a chamber that did not include the additional fuel evaporation enhancement features. Therefore, by incorporating these features into the first stage combustion chamber 28, the overall size of the exhaust gas after-treatment device 12 may be significantly reduced.

Once the flame originally produced in the primary combustion chamber 26 has been further developed in the first stage combustion chamber 28, the flame and exhaust gases travel into the second stage combustion chamber 30. The mixture that leaves the first stage combustion chamber and enters the second stage combustion chamber 30 is associated with a rich mixture containing unburnt fuel. The second stage combustion chamber 30, once again, is similar in structure to both the primary and first stage combustion chambers 26, 28 in that it too has an outer sidewall 50 formed with at least one circumferentially spaced opening 52. In this particular embodiment the second stage combustion chamber is formed with a plurality of circumferentially spaced openings 52. As well, the second stage combustion chamber 30 is generally larger in diameter than both the primary combustion chamber 26 and the first stage combustion chamber 28. The increased diameter of the second stage combustion chamber 30 and the increased number of circumferentially spaced openings 52 allow for more exhaust gases to be tangentially introduced into the second stage combustion chamber 30. The exhaust gases entering the second stage combustion chamber 30 provide additional oxygen and create increased turbulence due to the vortex action that is created by the exhaust gases being introduced tangentially into the chamber 30. The wider diameter of the second stage combustion chamber 30 allows for the expansion of the gases and increased flame development in this stage of the combustion without causing excess turbulence within the chamber 30 which would encourage the flame to develop axially rather than radially within the second stage combustion chamber 30. As well, by increasing the diameter of the second stage combustion chamber 30, the overall length of the burner 10 can be further reduced, which is favourable for certain applications. In some applications that only involve very small engines, however, it will be understood that the second stage combustion chamber 30 may be eliminated completely, relying solely on the combustion and flame development produced in the primary and first stage chambers 26, 28.

Once the flame is completely developed in the second stage combustion chamber 30, the exhaust gases are heated to the desired temperature wherein previously unburnt or uncombusted components or products have been burnt which directly contributes to a reduction in exhaust gas emissions. As well, the exhaust gases and combustion products leaving the second stage combustion have been warmed or heated to an increased temperature and can be directed further downstream to help activate additional after-treatment devices (i.e. filter elements or catalytic elements) and therefore, indirectly help to reduce exhaust gas emissions. Accordingly, once the exhaust gases and combustion products have been heated by the burner 10, the exhaust gases are then ready to be directed out of the burner 10 for further treatment downstream of the burner 10 in filter or catalytic elements, or for use elsewhere within the system. However, it will be understood that all of the exhaust gas that enters the outer housing 12 of the burner 10 through exhaust gas inlet 18 does not necessarily get sucked into or enter the various combustion chambers 26, 28, 30. A portion of the exhaust gases that enter the outer housing 12 will inevitably remain exterior to the primary, first stage and second stage combustion chambers 26, 28, 30 and will travel through the outer housing 12 from the inlet end 14 towards the outlet 16 around the periphery of the outer housing 12, effectively by-passing the primary, first stage and second stage combustion chambers 26, 28, 30. Therefore, to prevent exhaust gases from exiting the burner 10 at very different temperature levels and to ensure that the exhaust gases achieve a more even temperature distribution generally very soon after exiting the outlet end 16 of the burner 10, a second flame holder device 54 is positioned at the outlet end 16 of the outer housing 12. The second flame holder device 54 comprises first and second flame holder plates 56, 58. The first flame holder plate 56 is typically in the form of an annular plate with a central opening 60 of reduced diameter, the outer diameter of the plate 56 corresponding to the inner diameter of the outer housing 12. By positioning the first flame holder plate 56 within the outer housing downstream from the end of the second stage combustion chamber 30, all exhaust gases exiting the second stage combustion chamber 30 and any by-pass exhaust gases traveling at the periphery of the outer housing 12 are forced though the central opening 60 causing the cooler temperature by-pass gases to mix with the higher temperature gases leaving the second stage combustion chamber 30. The second flame holder plate 58 can be positioned slightly downstream from the first flame holder plate 56 and has a closed central portion 62 surrounded by openings 64 formed in the outer periphery of the plate 58. Accordingly, the exhaust gases travelling through the central opening 60 of the first flame holder plate 56 must now diverge towards the outer peripheral openings 64 formed in the second flame holder plate 58 which results in further mixing of exhaust gases and helps ensure that all exhaust gases exiting the burner 10 through the outlet end 16 achieve a generally even temperature profile downstream of the burner 10 shortly after they exit the outlet end 16 of burner 10. While the second flame holder device 54 has been described as comprising first and second flame holder plates 56, 58, the first plate 56 having a central opening 60 and the second plate having a closed centre 62 with circumferentially spaced peripheral openings 64, it will be understood that the second flame holder device 54 is not intended to be limited to this particular embodiment and that various other configurations of a flame holder device may be used to achieve the same mixing requirements so as to ensure the exhaust gases downstream from the burner 10 achieve a generally even temperature distribution shortly after they exit the outlet 16 of the burner 10.

It is desirable, however, to be able to control the amount the exhaust gas that is able to by-pass the primary, first stage and second stage combustion chambers 26, 28, 30 in order to optimize the flow distribution through and control the amount of backpressure within the burner 10. This not only helps to improve the overall efficiency and functioning of the burner 10, but it also allows the burner 10 to be specifically tailored and tuned to the exhaust gas flow rate for particular applications. Being able to specifically, and easily tailor a burner 10 is advantageous in that a single device can be adapted for various applications to ensure optimal reduction in exhaust gas emissions is achieved.

Figure 2:
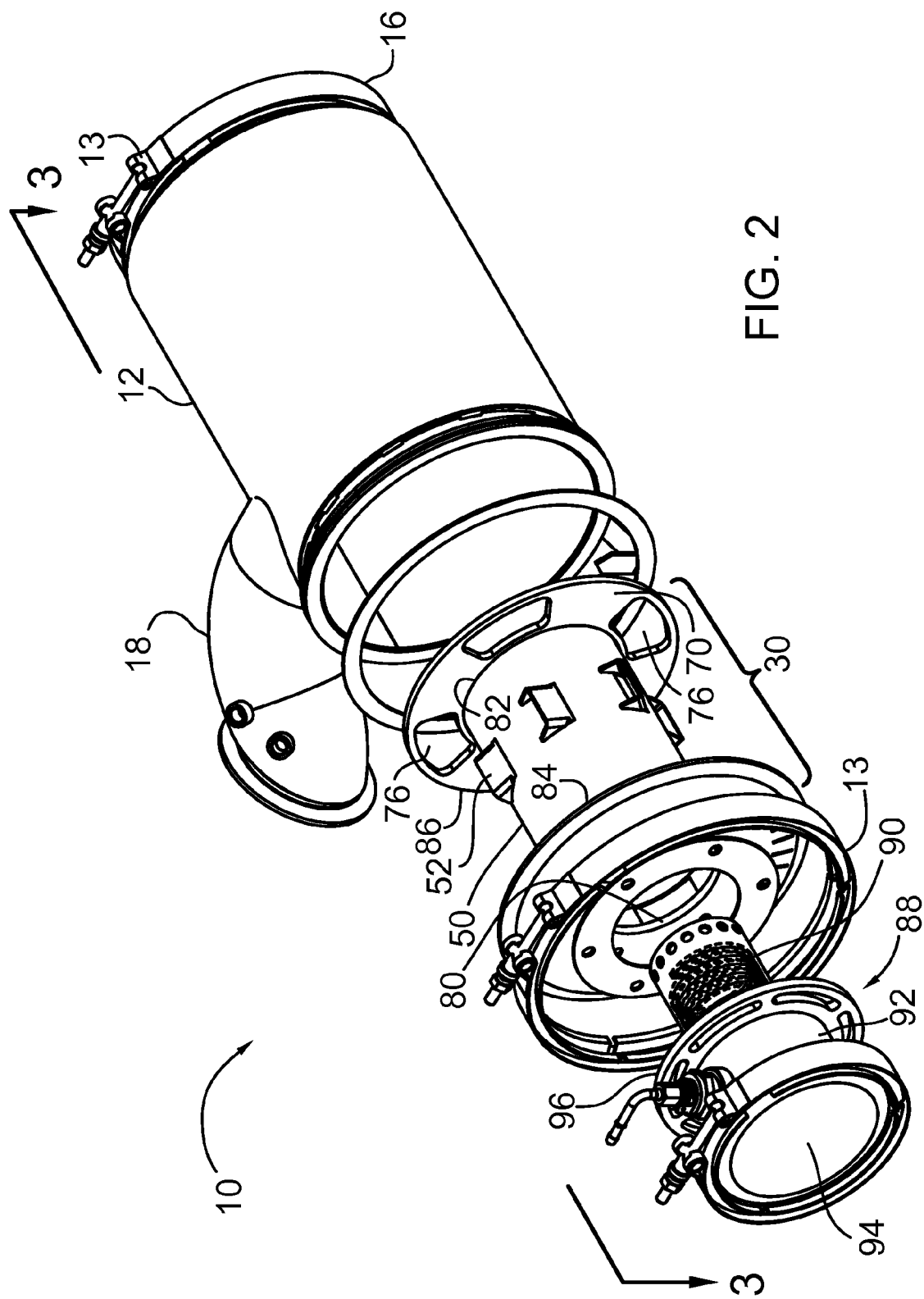
FIG. 2 is a detail exploded view of an example embodiment of a device according to the example embodiment shown in FIG. 1.

Therefore, as shown schematically in FIG. 1, the burner 10 may further include an adjustable by-pass 68 mounted within the outer housing 12 of the burner 10 on the end of and exterior to the second stage combustion chamber 30. The adjustable by-pass 68 provides a mechanism through which a series of openings can be adjusted between a fully open condition wherein large amounts of exhaust gas can by-pass the combustion chambers and a fully closed position wherein very little to no exhaust gas is permitted to by-pass the combustion chambers. In one embodiment, the adjustable bypass 68 is comprised of two mating first and second generally annular by-pass plates 70, 72 mounted generally at the end of the second stage combustion chamber 30, the outer diameters of the first and second annular by-pass plates 70, 72 corresponding to the inner diameter of the outer housing 12 with the central openings of the annular bypass plates 70, 72 generally corresponding to the size of the exit of the second stage combustion chamber 30. Typically, the first annular by-pass plate 70 is adjustably mounted within the outer housing 12 while the second annular by-pass plate 72 is fixed or stationary within the outer housing 12. The first and second annular by-pass plates 70, 72 each have a series of corresponding openings 76, 78 (see, e.g., FIGS. 2 and 4, respectively) formed in the outer peripheries thereof so that depending upon the degree of rotation of the first plate 70 with respect to the second plate 72, the openings 76, 78 can be adjusted from anywhere between the fully opened, to the fully closed position. Therefore, by determining the amount of by-pass required for a particular application, the first by-pass plate 70 can be rotated to the desired position with respect to the second by-pass plate 72 upon assembly of the burner 10.

Referring now to FIGS. 2-6, a specific embodiment of the example embodiment shown in FIG. 1 will now be described in detail. As shown generally in FIG. 2, the burner 10 is comprised of a series of cylindrical components which fit together to form the burner 10. In this specific example embodiment, the outer housing 12 is generally cylindrical in form, the first inlet end 14 (see, e.g., FIG. 3) and the second outlet end 16 being open. The exhaust gas inlet 18 is mounted proximal to the first, inlet end 14 of the outer housing 12 for introducing the exhaust gas, tangentially into the outer housing 12. The first and second ends 14, 16 of the outer housing 12 may be fitted with additional seals or clamping members, referred to generally by reference numeral 13, for securing or attaching the burner 10 to various other components within the overall system.

In this specific embodiment, the second stage combustion chamber 30 is in the form of a generally cylindrical member with the outer sidewall 50 extending between first and second open ends 80, 82. The open ends 80, 82 are formed with respective annular flanges 84, 86. The annular flange 84 of the first end 80 is a solid flange which partially closes the open, inlet end 14 of the outer housing 12 when the second stage combustion chamber 30 is mounted within the outer housing 12. The annular flange 86 formed at the second end 82 functions as the first by-pass plate 70 described above in connection with the adjustable by-pass 68 feature of the device 10. Accordingly, the annular flange 86 has the plurality of circumferentially spaced openings 76 formed therein. In this specific embodiment, the second by-pass plate 72 (see FIGS. 3 & 4) is mounted within the outer housing 12 proximal to the outlet end 16 of the outer housing 12 so that when the second stage combustion chamber 30 is inserted into the outer housing 12, the annular flange 86 formed on the second end 82 of the chamber abuts with and rests against the second by-pass plate 72.

In the subject embodiment, the second stage combustion chamber 30 is formed with a plurality of circumferentially spaced openings 52 formed in the outer sidewall 50 thereof, the circumferentially spaced openings 52 being in the form of hooded slots, which help to direct the exhaust gas tangentially into the interior cavity of the second stage combustion chamber 30. However, as described above, the openings 52 may be in various forms and are not intended to be limited to hooded slots as shown in FIGS. 2-6. Furthermore, only one opening 52 may be provided, provided that it is spaced and sized accordingly to achieve the desired degree of turbulence within the interior cavity of the second stage combustion chamber 30. In this embodiment, a second set of openings 87 (see, e.g., FIG. 4) is formed in the outer sidewall 50 at the first end 80 thereof at the base of the first annular flange 84. These openings 87 allow exhaust gases that have entered the outer housing 12 to flow through the first open end 80 of the second stage combustion chamber 30, as will be described in further detail below, to ensure that the primary combustion chamber 26 and the first stage combustion chamber 28 are exposed to the exhaust gases entering the outer housing 12 via exhaust gas inlet 18.

Figure 3:
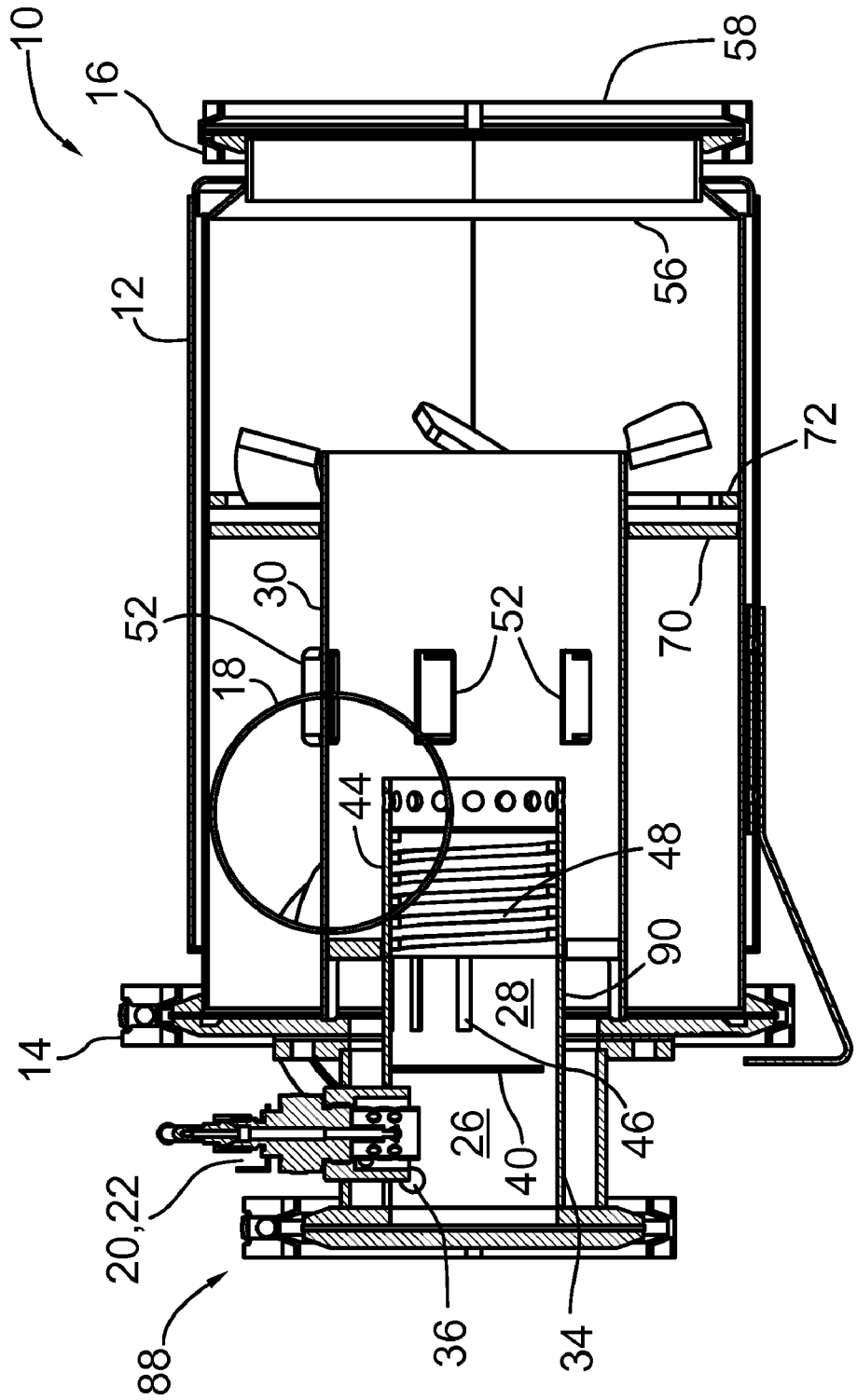
FIG. 3 is a cross-sectional view of the assembled device shown in FIG. 2 taken along section line 3-3.
Figure 6:
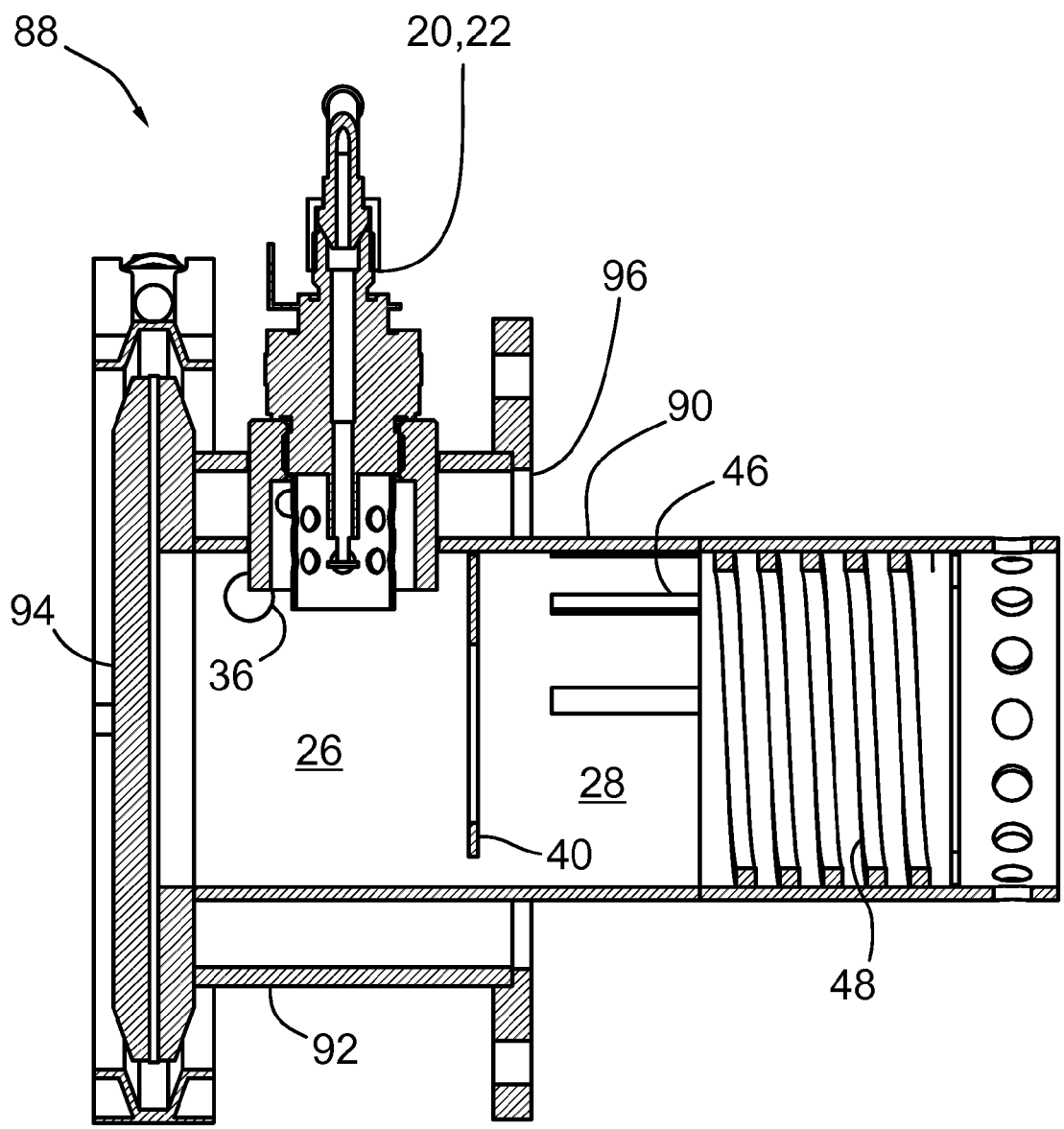
FIG. 6 is a cross-sectional view of the component shown in FIG. 5 taken along section line 6-6.

Once the second combustion chamber 30 has been inserted into the outer housing 12, another generally cylindrical component 88, which houses both the primary combustion chamber 26 and the first stage combustion chamber 28, is inserted through the opening in the first annular flange 84 of the second combustion chamber 30 and closes the open inlet end 14 of the outer housing 12. Component 88 comprises an inner cylindrical member 90, one end of which is surrounded by an annular cap-like structure 92. The cap-like structure 92 has a closed, outer end 94 and an open, flanged end 96 for abutting and sealing against a portion of the first annular flange 84 for closing the burner 10. Additional seals or gaskets may be provided and incorporated into the structure of the burner 10, if required, to ensure that the burner 10 is sealed when the components are mounted together, although other types of seals or no seals may be used. In this specific embodiment, the fuel inlet 20 and ignition device 22, which in the embodiment shown is in the form of a glow plug assembly, are mounted through the outer surface of the cap-like structure 92 and extend into the inner cylindrical member 90. The inner cylindrical member 90 extends from the closed outer end 94 of the cap-like structure 92, beyond the open flanged end 96 and into the second stage combustion chamber 30, defining both the primary combustion chamber 26 and the first stage combustion chamber 28. Accordingly, the fuel inlet 20 and ignition device 22 extend through the outer cap-like structure 92 and into a first portion of the inner cylindrical member 90 corresponding to the primary combustion chamber 26. As shown in FIGS. 3 and 6, the primary combustion chamber 26 is separated from the first stage combustion chamber 28 within the inner cylindrical member 90 by the first flame holder device 40, as described above in connection with the embodiment illustrated in FIG. 1. In the subject embodiment, only a single opening 36 is provided in the sidewall 34 of the primary combustion chamber 26 proximal to the fuel inlet 20 and glow plug assembly 22. Accordingly, some of the exhaust gases that enter the outer housing 12 will flow through openings 87 (see, e.g., FIG. 4) at the base of the first annular flange 84 at the first end of the second stage combustion chamber 30 and through the annular space between the inner cylindrical member 90 and the cap-like structure 92 and will enter the primary combustion chamber 26 through opening 36 and begin the combustion process, as described above.

The first stage combustion chamber 28 is formed in the second half of the inner cylindrical member 90 and is formed with the spiral, ridges 48 on the inner surface thereof and includes the plurality of circumferentially spaced slot-like openings 46 formed in the outer surface thereof. Accordingly, in some embodiments, the first stage combustion chamber 28 can generally be the same size or have the same diameter as the primary combustion chamber 26. The open end of the inner cylindrical member 90 extends into the second stage combustion chamber 30; therefore the developed flame and the exhaust gases that exit the first stage combustion chamber 28 can expand into the second stage combustion chamber 30 as described above.

Figure 4:
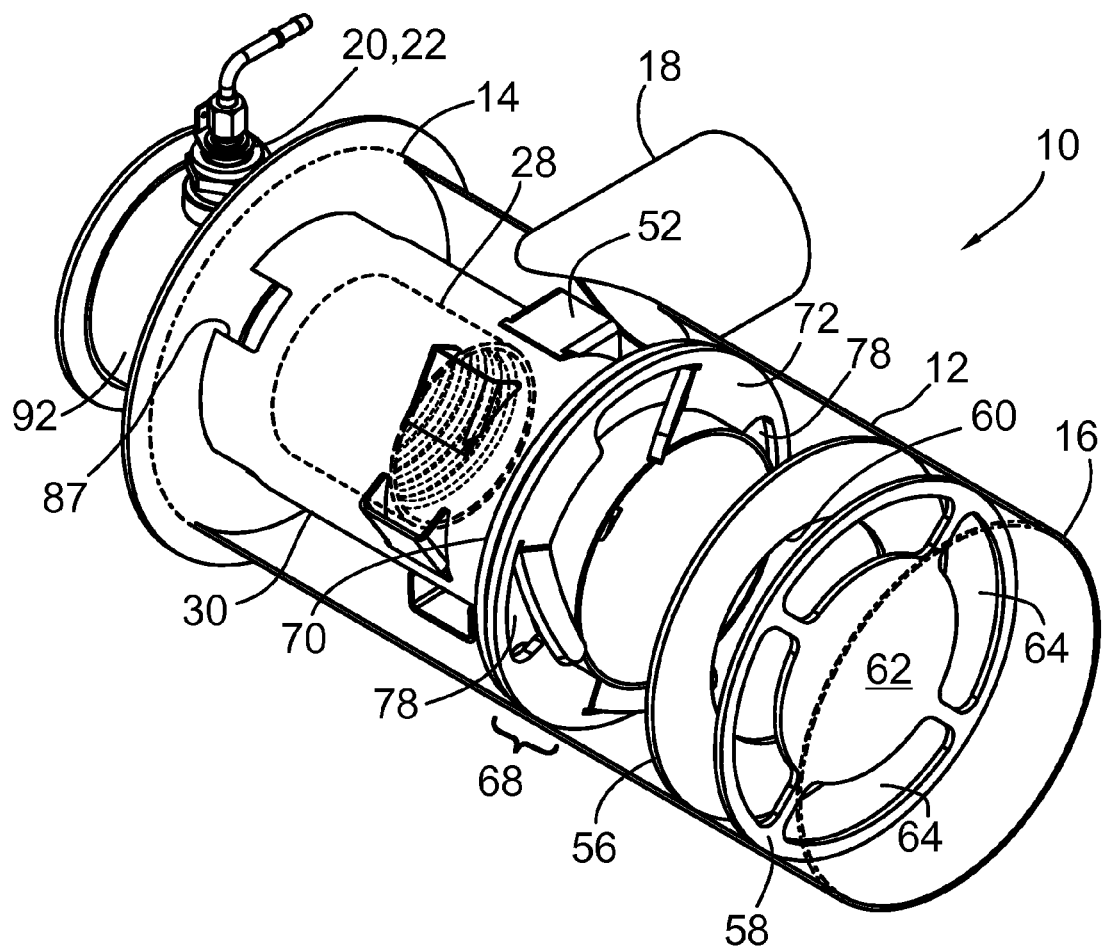
FIG. 4 is a perspective view of the assembled device of FIG. 3 with various elements shown in partial transparency for ease of illustration.
Figure 5:
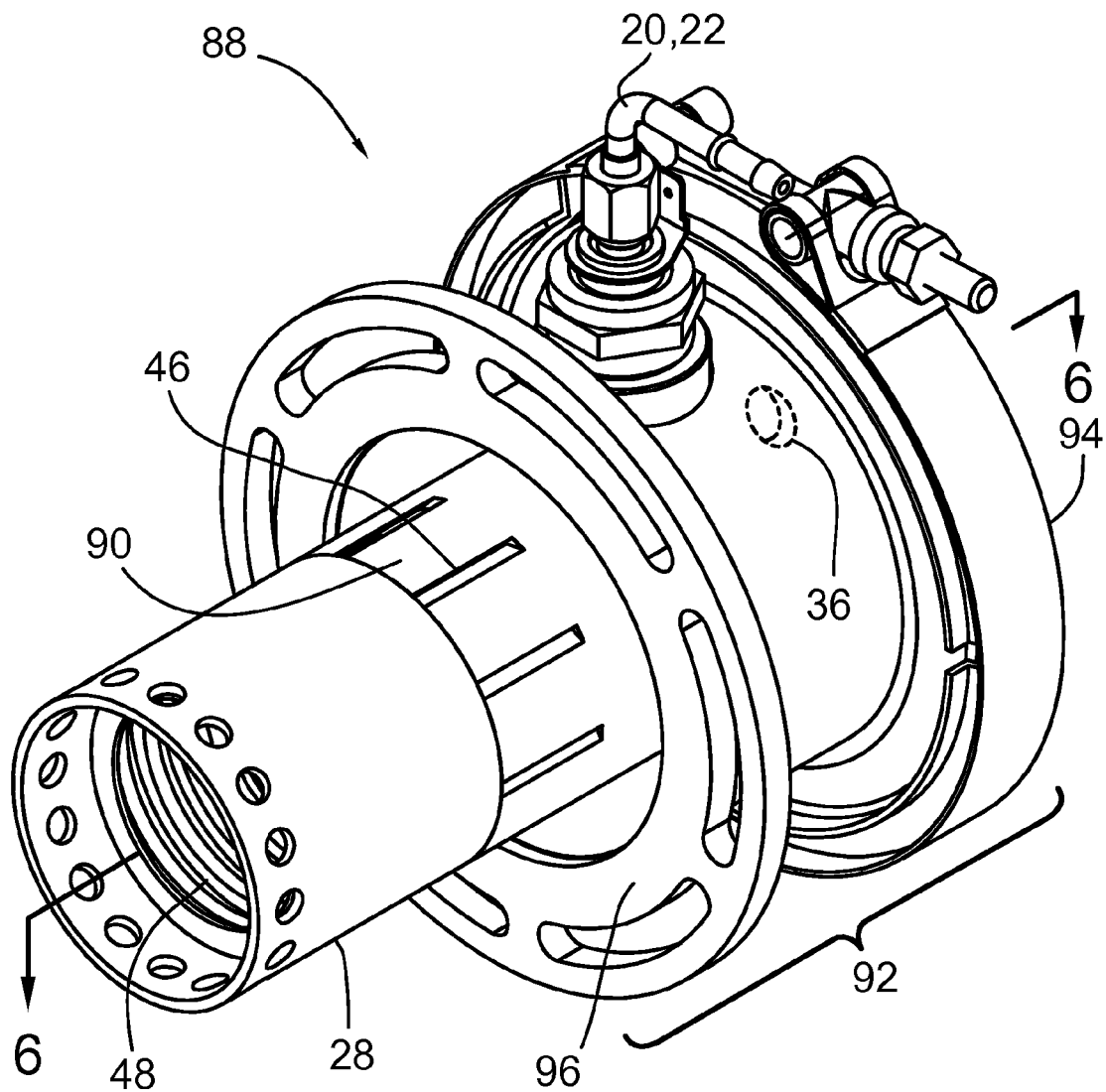
FIG. 5 is a perspective view of the component housing the primary and first stage combustion chambers of the device shown in FIGS. 2-4.

In this specific embodiment, the second flame holder device 54 is mounted within the outer housing 12 at the open, outlet end 16 thereof (see FIG. 4). As described above, the second flame holder device 54 includes first and second flame holder plates 56, 58 which are spaced apart from each other to cause the heated exhaust gases and the outer peripheral bypass exhaust gases to converge through a central opening in the first flame holder plate 56 and then diverge through a plurality of circumferentially spaced peripheral openings in the second flame holder plate 58 to ensure that all exhaust gases exiting the burner 10 have been mixed and achieve a generally even temperature distribution shortly after exiting the outlet of the burner 10.

It will be understood that while a specific embodiment of the burner 10 has been described, various modifications may be made to the design to achieve the same result; therefore, the present disclosure is not intended to be limited to the specific embodiment disclosed.

Figure 7:
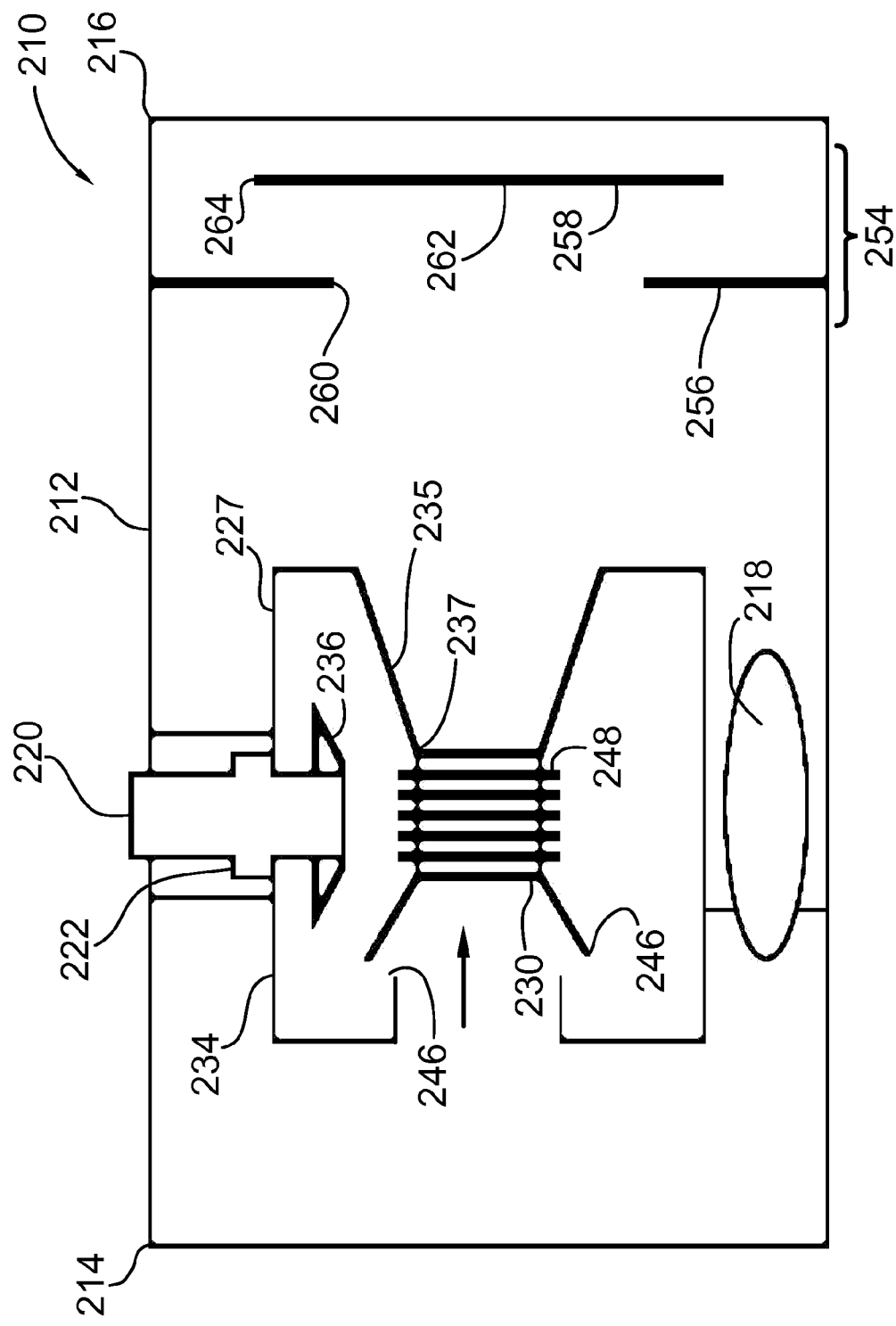
FIG. 7 is a cross-sectional schematic view of a device according to another example embodiment of the present disclosure.

Referring now to FIG. 7, there is shown a schematic drawing of an exemplary burner device according to another example embodiment of the present disclosure. In the following description, like reference numerals to those used in connection with the example embodiment shown in FIG. 1 have been used where appropriate, but increased by a factor of 200.

As shown schematically in FIG. 7, the burner 210 comprises an outer housing 212 having a first, closed end 214 and a second, open end 216. An exhaust gas inlet 218 is located generally centrally in the outer housing 212 for introducing exhaust gas tangentially into the interior of the outer housing 212. A fuel inlet 220 and ignition device 222, which in the embodiment shown is in the form of a glow plug assembly, are also generally centrally located in the outer housing 212 for introducing or supplying fuel to the burner 210. Once again, the fuel inlet 220 and glow plug assembly 222 are of relatively simple construction and do not include high-pressured fuel injection components. Mounted within the outer housing 212 are two concentrically arranged combustion chambers. The first combustion chamber 227 is a generally, annular chamber having an outer sidewall 234 and an inner side wall 235 which define a generally annular interior space. The inner sidewall 235, however, is formed so that it diverges outwardly from a central portion 237 towards the interior ends of the chamber 227.

The first combustion chamber 227 is mounted within the outer housing 212 so that it is in direct connection with the fuel inlet 220 and glow plug assembly 222. Therefore, fuel is supplied through the inlet 220 and glow plug assembly 222 directly into the first combustion chamber 227. At least one circumferentially spaced opening 236 is formed in the outer sidewall 234 of the first combustion chamber 227 for tangentially introducing exhaust gas that has entered the outer housing 212 via inlet 218 into the first combustion chamber 227. The exhaust gas that enters the first combustion chamber 227 provides sufficient oxygen supply and an appropriate amount of the turbulence, created by the swirling or vortex action of the exhaust gas to ignite the fuel as it enters the chamber 227. In this embodiment, the first combustion chamber 227 is large enough and is formed with sufficient openings 236 to not only ignite the fuel and begin the combustion process, but also develop the flame sufficiently and provide sufficient turbulence to help ensure proper mixing of the fuel and air (i.e. exhaust gas) to achieve a fuel-air mixture with desired properties to promote combustion. The central portion 237 of the inner sidewall 235 of the first combustion chamber 227 is also provided with fuel evaporation enhancing devices as described above in connection with the embodiments shown in FIGS. 1-6. In this embodiment, the inner surface of the central portion 237 of the inner sidewall 235 is formed with spiraling ridges 248 so as to increase the surface area of the first combustion chamber 227 and create a fuel evaporation zone. The fuel evaporation zone helps to ensure that all liquid fuel has been evaporated and that a rich mixture of fuel and exhaust gas has been achieved. Accordingly, the first combustion chamber 227 in the subject embodiment is essentially equivalent in function to the previously described primary combustion chamber 26 and the first stage combustion chamber 28 described in connection with FIG. 1. Therefore, it will be understood that in the present embodiment, the first combustion chamber 227 incorporates the previously described primary combustion chamber 26 and first stage combustion chamber 28.

The central portion 237 of the inner sidewall 235 of the annular first combustion chamber 227 substantially forms the outer sidewall of the second combustion chamber 230. Therefore, the ends of the second combustion chamber 230 are open to the interior of the outer housing 212. The second combustion chamber 230, therefore, is being continuously fed through the open diverging ends of the second combustion chamber 230 with the exhaust gases that enter the outer housing 212. An opening 246 is formed in the inner sidewall 235 of the first combustion chamber 227 which allows the flame that is formed in the first combustion chamber 227, and the exhaust gases from the first combustion chamber 227 to enter the second combustion chamber 230. The additional exhaust gases that enter the second combustion chamber 230 through the open ends thereof allow for further flame development and combustion to occur. Accordingly, the second combustion chamber 230 is essentially equivalent in function to the second stage combustion chamber 28 described above in connection with the embodiment shown in FIG. 1.

Once the flame has been fully developed within the second combustion chamber 230, the flame and exhaust gases exit the second combustion chamber 230 through the open ends thereof and are directed towards the outlet end 216 of the burner 210. As in the previously described embodiments, a flame holder device 254 is mounted within the outer housing 212 proximal to the outlet end 216 thereof. The flame holder device 254 is comprised of first and second flame holder plates 256, 258 as described above in connection with the embodiment shown in FIG. 1. The exhaust gases exiting the burner 210 therefore are sufficiently mixed upon exiting the burner 210 to ensure that the exhaust gases achieve a generally even temperature distribution slightly downstream from or shortly after exiting the burner 210 and, therefore, are in a suitable condition for further treatment (i.e. in filter or catalytic elements) within the exhaust system of the engine. Accordingly, in the subject embodiment, burner 210 serves to increase the temperature of incoming exhaust gas and burn particulate matter and unburnt hydrocarbons and/or other harmful emissions. However, the burner 210 may also be used in applications where a heat source is required in order to bring the temperature of other catalytic components in further treatment devices into an optimal operating range, thereby indirectly reducing the overall exhaust gas emissions from engine or exhaust gas source by ensuring filter or catalytic elements operate under optimal conditions.

The various embodiments presented above are merely examples and are in no way meant to limit the scope of this disclosure. Variations of the innovations described herein will be apparent to persons of ordinary skill in the art, such variations being within the intended scope of the present application. The subject matter described herein and in the recited claims intends to cover and embrace all suitable changes in technology.

The invention claimed is:

1. A burner, comprising:
an outer housing having a first end and a second, outlet end;
a gas inlet connected to said outer housing for introducing a stream of gas tangentially into said outer housing, the gas inlet being connected to a gas source;
a primary combustion chamber mounted in communication with said outer housing and having at least one opening formed therein for introducing gas from the gas inlet tangentially into the primary combustion chamber;
a first stage combustion chamber mounted within said outer housing and in communication with said primary combustion chamber, the first stage combustion chamber having at least one opening formed therein for introducing additional gas from the gas inlet tangentially into said first stage combustion chamber;
a second stage combustion chamber mounted within said outer housing and in communication with said first stage combustion chamber, the second stage combustion chamber having at least one opening formed therein for introducing additional gas from the gas inlet tangentially into said second stage combustion chamber, the second stage combustion chamber being in communication with the second, outlet end of the outer housing;
a fuel inlet disposed in communication with the primary combustion chamber for introducing fuel into the primary combustion chamber, the fuel inlet being located proximal to the at least one opening formed in the primary combustion chamber; and
an ignition device mounted in conjunction with the fuel inlet for igniting fuel upon introduction into the primary combustion chamber;
wherein at least a portion of the gas entering the burner is mixed with fuel introduced by the fuel inlet, said gas and fuel mixture being ignited within the primary combustion chamber and undergoing further combustion in the first stage and second stage combustion chambers to increase the temperature of the gas exiting the burner and to aid in the reduction of particulate matter and unburnt gaseous constituents within the gas,
wherein a portion of the gas entering the device through the gas inlet flows directly to the second, outlet end of the outer housing by-passing the primary, first stage and second stage combustion chambers,
further including an adjustable by-pass mounted within the outer housing for controlling the portion of gas that by-passes the primary, first stage and second stare combustion chambers,
wherein the adjustable by-pass comprises:
a first by-pass plate adjustably mounted within the outer housing, the first by-pass plate having a series of openings formed therein; and
a second by-pass plate fixed within the outer housing, the second by-pass plate having a series of openings formed therein corresponding to the openings formed in the first by-pass plate;
wherein the first by-pass plate abuts with and is rotatable with respect to the second by-pass plate through a series of positions between a fully open position, wherein the openings formed in the first and second by-pass plates are fully aligned permitting gas to flow therethrough and a fully closed position wherein the openings in the first and second by-pass plates are completely blocked permitting no gas to flow therethrough.

2. The burner as claimed in claim 1, wherein the gas is exhaust gas of an internal combustion engine.

3. The burner as claimed in claim 1, further comprising a first flame holder device mounted between the primary combustion chamber and the first stage combustion chamber, the first flame holder device providing a reduced, opening between the primary combustion chamber and the first stage combustion chamber for protecting the interior of the primary combustion chamber from the additional gas entering the first stage combustion chamber and for increasing the temperature within the primary combustion chamber.

4. The burner as claimed in claim 3, wherein the first flame holder device is in the form of an internal plate-like member.

5. The burner as claimed in claim 1, further comprising a second flame holder device mounted at the second, outlet end of the outer housing for mixing the gas and combustion products from the second stage combustion chamber to ensure a generally even temperature distribution is achieved downstream from the second, outlet end of the outer housing.

6. The burner as claimed in claim 5, wherein the gas is exhaust gas from a diesel engine, and wherein a diesel particulate filter is mounted downstream from the outlet end of the burner, the generally even temperature distribution being achieved prior to the exhaust gas contacting the diesel particulate filter.

7. The burner as claimed in claim 5, wherein the second flame holder device comprises: a first plate in the form of an annular plate having a reduced, central opening for directing gas and combustion products from the second stage combustion chamber through the reduced, central opening; and a second plate positioned downstream from the first plate, the second plate having a closed, central portion generally axially aligned with the reduced, central opening of the first plate and a plurality of openings formed in the periphery of the second plate about the closed, central portion for directing the gas and combustion products flowing through the reduced, central opening outwardly towards the peripheral openings in the second plate.

8. The burner as claimed in claim 1, further comprising a fuel evaporation enhancing device mounted within said first stage combustion chamber for promoting evaporation and minimizing condensation of any residual fuel within the first stage combustion chamber.

9. The burner as claimed in claim 8, wherein the fuel evaporation enhancing device comprises spiraling ridges formed on the inner surface of the first stage combustion chamber.

10. The burner as claimed in claim 8 wherein the fuel evaporation enhancing device is in the form of a wire mesh inserted in the first stage combustion chamber.

11. The burner as claimed in claim 8, wherein the fuel evaporation enhancing device serves to increase the surface area of the first stage combustion chamber.

12. The burner as claimed in claim 8, wherein the fuel evaporation enhancing device includes a catalytic component.

13. The burner as claimed in claim 1, wherein the primary combustion chamber, the first stage combustion chamber and the second stage combustion chamber are generally cylindrical bodies wherein the diameter of the second stage combustion chamber is larger than the diameter of the first stage combustion chamber and the primary combustion chamber.

14. The burner as claimed in claim 1, wherein the at least one opening formed in the primary combustion chamber is a generally circular opening located in close proximity to the fuel inlet and ignition device assembly.

15. The burner as claimed in claim 1, wherein the at least one opening formed in the first stage combustion chamber is in the form of one of the following alternatives: a single, generally circular opening, a plurality of circumferentially spaced slots, a plurality of circumferentially spaced tangential openings, or a plurality of circumferentially spaced hooded slots or openings.

16. The burner as claimed in claim 1, wherein the at least one opening formed in the second stage combustion chamber is in the form of one of the following alternatives: a single, generally circular opening, a plurality of circumferentially spaced slots, a plurality of circumferentially spaced tangential openings, or a plurality of circumferentially spaced hooded slots or openings.

17. The burner as claimed in claim 1, wherein the primary combustion chamber and the first stage combustion chamber are combined in a single combustion chamber.

18. The burner as claimed in claim 17, wherein the single combustion chamber comprising the primary combustion chamber and the first stage combustion chamber includes a fuel evaporation enhancing device mounted within said single combustion chamber for promoting evaporation and minimizing condensation of any residual fuel within the single combustion chamber.

19. The burner as claimed in claim 18, wherein the fuel evaporation enhancing device is selected from one of the following alternatives: spiraling ridges formed on the inner surface of the single combustion chamber, a wire mesh mounted within the single combustion chamber, or a catalytic component mounted within the single combustion chamber.

20. The burner as claimed in claim 1, wherein said gas is exhaust gas and said gas source is a diesel engine and the fuel introduced into the primary combustion chamber is diesel fuel.

21. The burner as claimed in claim 20, wherein the ignition device is a glow plug assembly.

22. A burner for heating an incoming exhaust gas stream, the burner comprising:
   an outer housing having a first end and a second, outlet end;
   an exhaust gas inlet connected to said outer housing for introducing exhaust gas tangentially into said outer housing, the exhaust gas inlet being connected to an exhaust gas source;
   a primary combustion chamber mounted in communication with said outer housing and having at least one opening formed therein for introducing exhaust gas from the exhaust gas inlet tangentially into the primary combustion chamber;
   a first stage combustion chamber mounted within said outer housing and in communication with said primary combustion chamber, the first stage combustion chamber having at least one opening formed therein for introducing further exhaust gas tangentially into said first stage combustion chamber;
   a fuel inlet disposed in communication with the primary combustion chamber for introducing fuel into the primary combustion chamber, the fuel inlet being located proximal to the at least one opening formed in the primary combustion chamber; and
   an ignition device mounted in conjunction with the fuel inlet for igniting fuel upon injection into the primary combustion chamber;
   wherein at least a portion of the exhaust gas entering the burner is mixed with fuel introduced by the fuel inlet, said exhaust gas and fuel mixture being ignited within the primary combustion chamber and undergoing further combustion in the first stage combustion chamber to increase the temperature of the gas exiting the burner and to aid in the reduction of particulate matter and unburnt gaseous constituents within the exhaust gas,
   wherein a portion of the gas entering the burner through the gas inlet flows directly to the second, outlet end of the outer housing by-passing the primary and first stage combustion chambers,
   further including an adjustable by-pass mounted within the outer housing for controlling the portion of gas that by-passes the primary and first stage combustion chambers,
   wherein the adjustable by-pass comprises:
      a first by-pass plate adjustably mounted within the outer housing, the first by-pass plate having a series of openings formed therein; and
      a second by-pass plate fixed within the outer housing, the second by-pass plate having a series of openings formed therein corresponding to the openings formed in the first by-pass plate;
      wherein the first by-pass plate abuts with and is rotatable with respect to the second by-pass plate through a series of positions between a fully open position, wherein the openings formed in the first and second by-pass plates are fully aligned permitting gas to flow therethrough and a fully closed position wherein the openings in the first and second by-pass plates are completely blocked permitting no gas to flow therethrough.

23. The burner as claimed in claim 22, further comprising a second stage combustion chamber mounted within said outer housing and in communication with said first stage combustion chamber, the second stage combustion chamber having at least one opening formed therein for introducing further exhaust gas tangentially into said second stage combustion chamber, the second stage combustion chamber being in communication with the second, outlet end of the outer housing.

24. The burner as claimed in claim 22, wherein the primary combustion chamber and the first stage combustion chamber are combined in a single combustion chamber.

25. The burner as claimed in claim 24, further comprising a second stage combustion chamber concentrically mounted with and in communication with the single combustion chamber.

26. The burner as claimed in claim 25, wherein the single combustion chamber includes a fuel evaporation enhancing device mounted therein for promoting evaporation of residual fuel within the single combustion chamber.

27. The burner as claimed in claim 26, wherein the fuel evaporation enhancing device is selected from one of the following alternatives: spiraling ridges formed on the inner surface of the single combustion chamber, a wire mesh mounted within the single combustion chamber, or a catalytic component or metallic foam mounted within the single combustion chamber.

28. The burner as claimed in claim 25, further comprising a flame holder device mounted at the second, outlet end of the outer housing for mixing the exhaust gas and combustion products from the second stage combustion chamber to ensure that exhaust gases exiting the second, outlet end of the outer housing achieve a generally even temperature distribution downstream from the second, outlet end of the outer housing.

29. The burner as claimed in claim 22, wherein said exhaust gas source is a diesel engine and the fuel introduced into the primary combustion chamber is diesel fuel, and wherein the ignition device is a glow plug assembly.

30. The burner as claimed in claim 29, wherein a diesel particulate filter is positioned downstream from and in communication with the outlet end of the burner, the burner heating the exhaust gases to regenerate particulate matter within the exhaust gas.

31. The burner as claimed in claim 29, wherein the burner is positioned upstream from and in communication with a diesel oxidation catalyst.

* * * * *